United States Patent
Atalla et al.

(10) Patent No.: US 9,680,344 B2
(45) Date of Patent: Jun. 13, 2017

(54) MULTIPHASE ELECTRICAL MACHINE AND METHOD OF USE

(71) Applicant: General Electric Company, Schenectady, NY (US)

(72) Inventors: Ashraf Said Atalla, Clifton Park, NY (US); Manoj Ramprasad Shah, Latham, NY (US); Satish Prabhakaran, Niskayuna, NY (US); James Pellegrino Alexander, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/940,498

(22) Filed: Nov. 13, 2015

(65) Prior Publication Data

US 2017/0141633 A1    May 18, 2017

(51) Int. Cl.
| | |
|---|---|
| *H02K 17/12* | (2006.01) |
| *H02K 3/28* | (2006.01) |
| *H02K 11/04* | (2016.01) |
| *H02K 11/00* | (2016.01) |
| *H02P 27/04* | (2016.01) |

(52) U.S. Cl.
CPC .......... *H02K 3/28* (2013.01); *H02K 11/001* (2013.01); *H02K 11/0094* (2013.01); *H02K 11/04* (2013.01); *H02P 27/04* (2013.01)

(58) Field of Classification Search
CPC .................................. H02M 1/12; H02K 3/28
See application file for complete search history.

(56) References Cited

U.S. PATENT DOCUMENTS

| | | |
|---|---|---|
| 5,379,207 A | 1/1995 | Shah |
| 5,515,264 A | 5/1996 | Stacey |
| 5,783,891 A | 7/1998 | Auinger et al. |
| 5,852,553 A | 12/1998 | Stacey |

(Continued)

FOREIGN PATENT DOCUMENTS

| | | |
|---|---|---|
| CN | 103078315 A | 5/2013 |
| WO | 2012016062 A2 | 2/2012 |

OTHER PUBLICATIONS

De Silva et al., "Analysis of Concentrated Winding Multi-phase Machines under Phase Failure using Decoupled Vector Space Theory", Power Electronics, Machines and Drives, 2006. The 3rd IET International Conference on, pp. 420-424, Apr. 4-6, 2006, Ireland.

(Continued)

*Primary Examiner* — Shawki S Ismail
*Assistant Examiner* — Muhammad S Islam
(74) *Attorney, Agent, or Firm* — Nitin N. Joshi (57) ABSTRACT

An electrical machine is provided. The electrical machine includes a stator, a rotor, and a plurality of switches. The stator includes main windings and auxiliary windings. The rotor is couplable to a prime mover configured to turn the rotor relative to the stator to generate at least six phases of alternating current (AC) power at the main windings. The plurality of switches is respectively coupled between the auxiliary windings and groups of the main windings. The plurality of switches is configured to convert the at least six phases to three phases when the plurality of switches is closed.

21 Claims, 5 Drawing Sheets

(56) References Cited

U.S. PATENT DOCUMENTS

| | | | | |
|---|---|---|---|---|
| 6,087,738 A * | 7/2000 | Hammond | ............... | H01F 29/04 |
| | | | | 307/17 |
| 6,424,552 B1 | 7/2002 | Jacobson | | |
| 7,830,681 B2 | 11/2010 | Abolhassani et al. | | |
| 2005/0012479 A1 | 1/2005 | Wolf et al. | | |
| 2006/0227582 A1* | 10/2006 | Wei | ................. | H02M 7/06 |
| | | | | 363/126 |
| 2007/0258275 A1* | 11/2007 | Brochu | ................. | H02M 7/08 |
| | | | | 363/64 |
| 2009/0033251 A1 | 2/2009 | Perisic et al. | | |
| 2010/0141028 A1* | 6/2010 | Rozman | ................. | H02J 1/12 |
| | | | | 307/9.1 |
| 2013/0088017 A1* | 4/2013 | Jia | ................. | H02K 3/28 |
| | | | | 290/1 A |
| 2013/0176756 A1 | 7/2013 | Kruse et al. | | |
| 2014/0016356 A1* | 1/2014 | Furmanczyk | ............ | H02M 5/14 |
| | | | | 363/3 |

OTHER PUBLICATIONS

Great Britain Search and Examination Report issued in connection with corresponding GB Application No. 618989.6 on Mar. 23, 2017.

* cited by examiner

MULTIPHASE ELECTRICAL MACHINE AND METHOD OF USE

BACKGROUND

The field of the disclosure relates generally to multiphase electrical machines and, more particularly, to an electrical machine operable as a multiphase motor and a multiphase generator and a method of use thereof.

Many known electrical systems perform both electrical motoring and generation during the course of normal operation. For example, and without limitation, certain vehicle power systems, such as aircraft power systems, include electrical machines that are utilized as a motor for propulsion and may also be utilized as electrical generators. While motoring, electrical power from an auxiliary source is applied to the electrical machine to turn a rotor attached to a mechanical load. Mechanical loads include, for example, and without limitation, turning a drive shaft to start an engine or to accelerate a vehicle. Auxiliary power sources include, for example, and without limitation, various alternating current (AC) and direct current (DC) power sources, such as AC grid power, a battery, a photovoltaic array, or any other suitable power source for the mechanical load. While generating, a prime mover turns the rotor to generate AC power. The generated AC power is then distributed to one or more AC or DC loads.

AC power generated by a particular known electrical machine is typically produced at a particular voltage and with one or more phases. Such AC power is then converted by a transformer to an appropriate voltage level to power a given AC load, and further converted by a rectifier to DC to power a given DC load. Rectifying AC power to DC power generally yields higher quality DC power when the AC power is multiphase, e.g., 3-phase, 6-phase, and 12-phase. For example, phase-shifted outputs of the rectifier combine to produce low-ripple voltages and currents due to cancellation of phase-shifted harmonics. Likewise, motoring under auxiliary power typically utilizes single- or 3-phase power. Consequently, an electrical machine that both motors and generates typically does so with 3-phase power.

Many known electrical systems that utilize the known motor-generator electrical machines described above generally include additional power electronics to perform the necessary motoring and generating functions. For example, and without limitation, a known aircraft power system may include an auto-transformer rectifier unit (ATRU) including an auto-transformer unit (ATU) and a rectifier. When generating, the ATU converts generated 3-phase power to a higher-order multiphase power, i.e., 6-phase or more. The multiphase power is then rectified to DC and distributed to the AC or DC electrical loads. The additional power electronics used for converting to multiphase power and then to DC power are often nearly as heavy as the electrical machine itself. The additional weight in the electrical system reduces efficiency. Further, the necessary transformers and rectifiers typically introduce losses themselves, including, for example, and without limitation, commutation losses and parasitic losses.

BRIEF DESCRIPTION

In one aspect, an electrical machine is provided. The electrical machine includes a stator, a rotor, and a plurality of switches. The stator includes main windings and auxiliary windings. The rotor is couplable to a prime mover configured to turn the rotor relative to the stator to generate at least six phases of alternating current (AC) power at the main windings. The plurality of switches is respectively coupled between the auxiliary windings and groups of the main windings. The plurality of switches is configured to convert the at least six phases to three phases when the plurality of switches is closed.

In another aspect, a method of using an electrical machine is provided. The method includes generating at least six phases of alternating current (AC) power at main windings of a stator of the electrical machine. The method further includes coupling auxiliary windings of the stator to groups of the main windings to convert the at least six phases to three phases. The method further includes motoring under auxiliary AC power applied to the three phases of the electrical machine.

In yet another aspect, an electrical system is provided. The electrical system includes an electrical machine, a controller, a rectifier, and a transformer. The electrical machine includes main windings and auxiliary windings. The electrical machine is operable to generate a multiphase alternating current (AC) power, and further operable to motor under three-phase AC power. The controller is configured to couple the auxiliary windings to the main windings when motoring under the three-phase AC power. The controller is further configured to decouple the auxiliary windings when generating the multiphase AC power. The rectifier is configured to rectify the multiphase AC power to a direct current (DC) power. The transformer is configured to convert the DC power to a DC output voltage.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

"Couplable" is a property of two or more objects that are readily coupled to and decoupled from each other. The coupling and decoupling may be, for example, and without limitation, electrical or mechanical. The coupling may be direct, or may include additional components to facilitate the coupling and decoupling. For example, two electrical circuits may be couplable through one or more switches. Similarly, two mechanical components may be couplable by a fastener or through gearing.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to multiphase electrical machines. The electrical machines described herein provide multiphase power generation and three-phase motoring capability. Further, the electrical machines described herein utilize a set of auxiliary windings while motoring. The auxiliary windings are designed to have a particular phase and amplitude such that they each combine with a corresponding main winding to convert the multiphase electrical machine to a three-phase electrical machine, thereby facilitating motoring under an auxiliary three-phase input power. The auxiliary windings are de-energized while the electrical machine is generating power. The electrical machines described herein further include power electronics, such as, for example, and without limitation, rectifiers, filters, and transformers to convert generated multiphase AC power to a DC output voltage.

Figure 1:
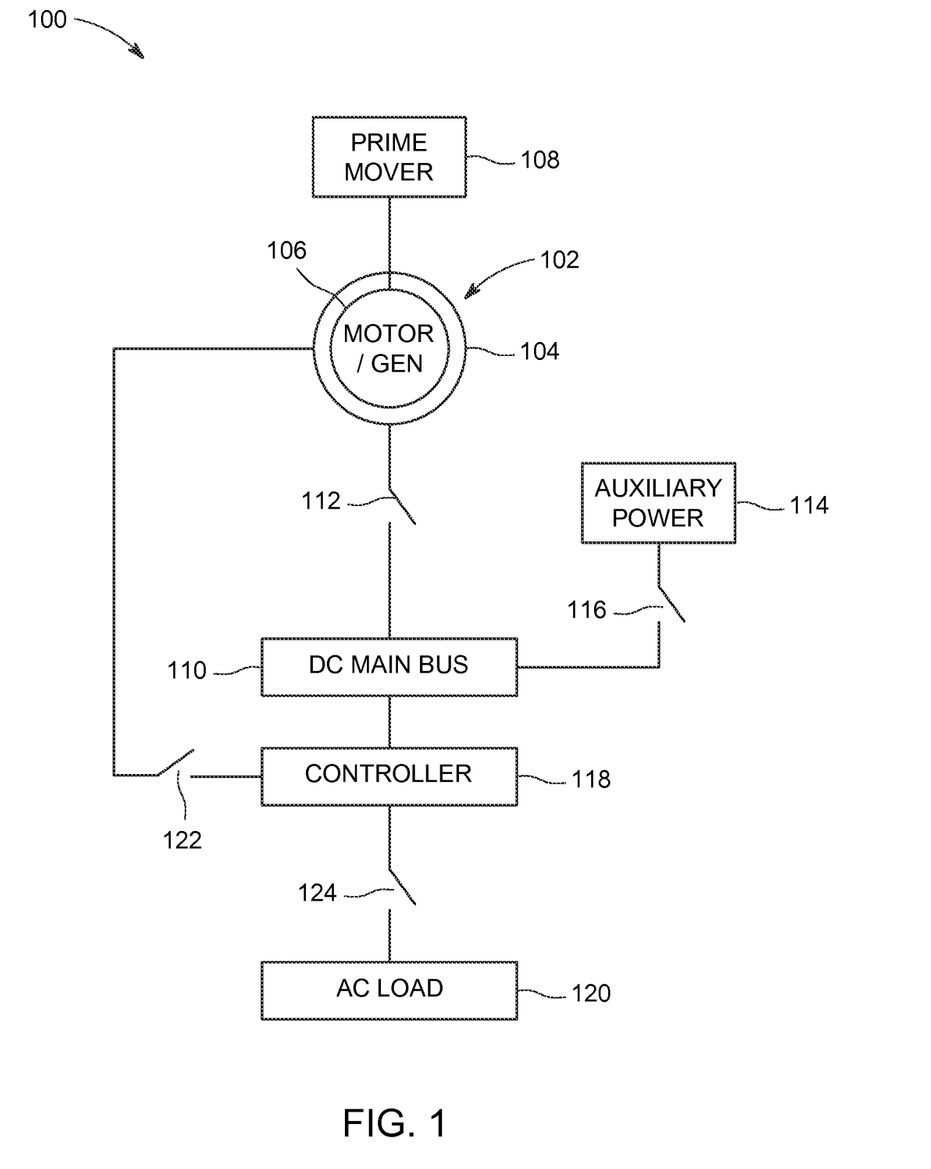
FIG. 1 is a schematic diagram of an exemplary electrical system.

FIG. 1 is a schematic diagram of an exemplary electrical system 100. Electrical system 100 includes an electrical machine, such as motor/generator 102. Motor/generator 102 includes a stator 104 and a rotor 106. During power generation, rotor 106 is couplable to a prime mover 108 that turns rotor 106 relative to stator 104 when motor/generator 102 is motoring. In certain embodiments, prime mover 108 is decoupled from rotor 106 when motor/generator 102 is generating. Prime mover 108 generally includes a drive shaft coupled to an engine, turbine, or any other suitable source of mechanical energy. Prime mover 108, in certain embodiments, couples to rotor 106 through a gear box (not shown). As rotor 106 turns relative to stator 104, multiphase AC power is generated at stator 104. The multiphase power is converted to DC power for distribution.

During motoring, power applied to stator 104 turns rotor 106, which is couplable to a mechanical load. The mechanical load, in certain embodiments, includes cranking an engine. The mechanical load may include any other suitable mechanical load, including, for example, and without limitation, a turbine, a drum, and a propulsion system.

Electrical system 100 includes a DC main bus 110 couplable to stator 104 of motor/generator 102 through a generator disconnect switch 112. DC power generated by motor/generator 102 is supplied to DC main bus 110 for distribution. Electrical system 100 further includes an auxiliary power source 114 couplable to DC main bus 110 through an auxiliary power disconnect switch 116. During generation, generator disconnect switch 112 is closed to permit motor/generator 102 to energize DC main bus 110. In certain embodiments, auxiliary power disconnect switch 116 is open during generation. In other embodiments, auxiliary power disconnect switch 116 is closed to facilitate charging of auxiliary power source 114. During motoring, generator disconnect switch 112 is open and auxiliary power disconnect switch 116 is closed. Auxiliary power source 114 energizes DC main bus 110 and ultimately provides power to turn rotor 106 of motor/generator 102. Auxiliary power source 114, in certain embodiments, includes a battery or other suitable energy reservoir for storing electrical energy. In certain embodiments, auxiliary power source 114 includes a photovoltaic, wind generator, combustion generator, or other suitable electrical power source.

Electrical system 100 further includes a controller 118 coupled to DC main bus 110. During motoring, controller 118 is configured to regulate auxiliary power provided to stator 104 of motor/generator 102 through DC main bus 110. Controller 118, in certain embodiments, includes power electronics for converting DC power from DC main bus 110 to AC power suitable for powering an AC load 120 and for cranking motor/generator 102. Such power electronics include, for example, and without limitation, a three-phase inverter. Controller 118 provides power from DC main bus 110 to stator 104 through a motor disconnect switch 122. Controller 118 provides power to AC load 120 through a load disconnect switch 124.

In certain embodiments, electrical system 100 first operates as a motor, where motor/generator 102 cranks rotor 106 under auxiliary power from auxiliary power source 114 to start an engine. During motoring, in certain embodiments, auxiliary power is provided only to stator 104 and is not distributed to AC load 120. Once the engine reaches an appropriate speed, electrical system transitions to power generation, where the engine operates as prime mover 108. During generation, auxiliary power source 114 is disconnected and generated DC power is put on DC main bus 110 where it is distributed to AC load 120.

Figure 2:
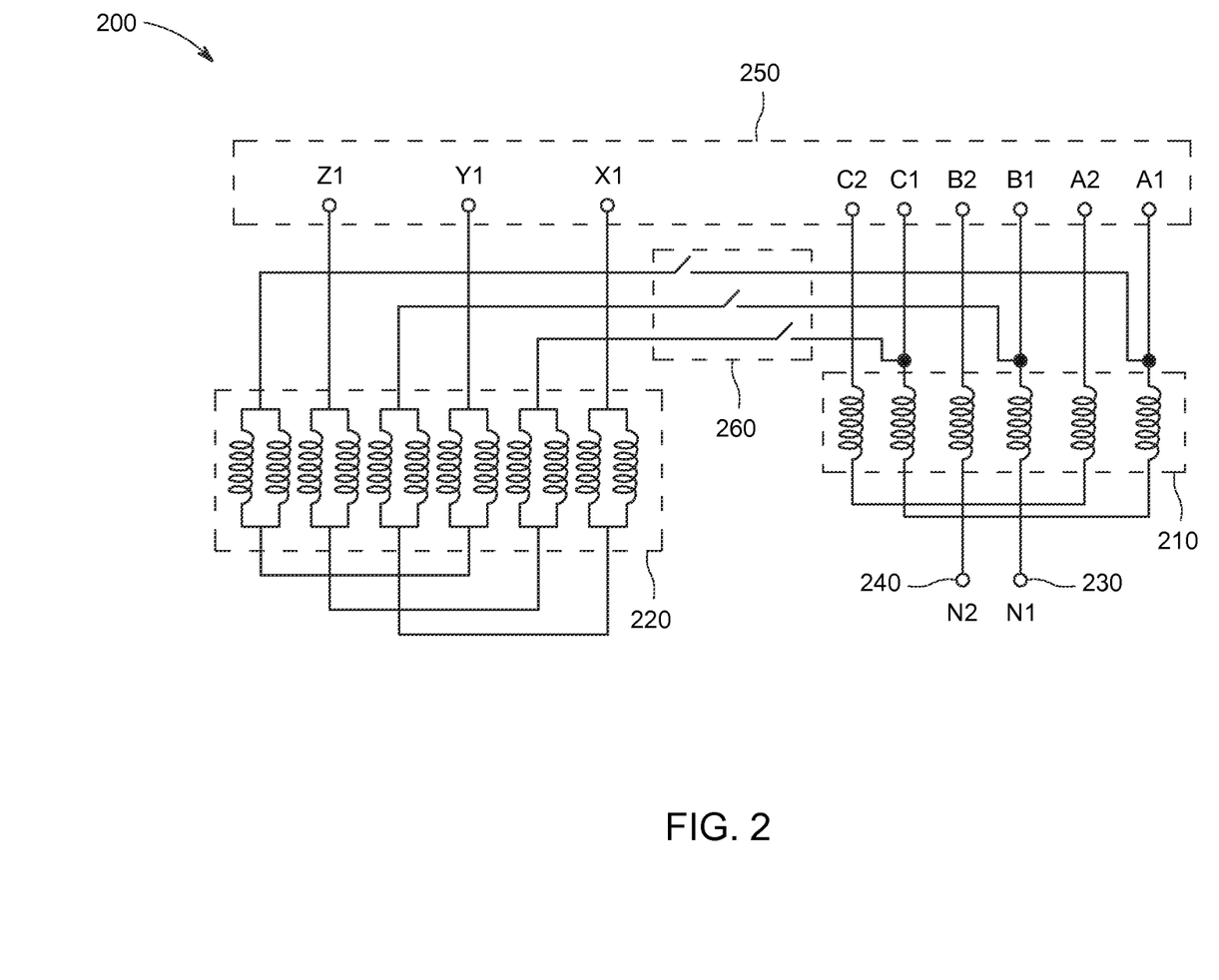
FIG. 2 is a schematic diagram of windings for an exemplary electrical machine for use in the electrical system shown in FIG. 1.

FIG. 2 is a schematic diagram of windings for an exemplary electrical machine 200 for use in electrical system 100 (shown in FIG. 1). Electrical machine 200 includes main windings 210 and auxiliary windings 220. Main windings 210 are used while electrical machine 200 is operating as a generator. While motoring, electrical machine 200 uses both main windings 210 and auxiliary windings 220. Electrical machine 200 includes six main windings organized into two sets of three phases: A1, B1, C1 and A2, B2, C2, the sets complemented with neutral lines 230 and 240, i.e., N1 and N2.

In alternative embodiments, electrical machine 200 includes any number of phases greater than three. For example, certain embodiments include increments of three phases, such as six phases, nine phases, and twelve phases. The multiphase power output of such embodiments improves the harmonic quality of the rectified DC output power.

During generation, electrical machine 200 generates AC power at winding terminals 250. Further, electrical machine 200 de-energizes auxiliary windings 220 by opening switches 260, isolating auxiliary windings 220 from AC voltages produced at terminals A1, B1, C1, A2, B2, and C2. The AC voltages generated by main windings 210 are each phase shifted from another by a phase differential. The phase differential, in certain embodiments, the phase differential is constant among all phases. In alternative embodiments, the phase differential varies among the phases.

During motoring, electrical machine 200 utilizes main windings 210 and auxiliary windings 220. Switches 260 are closed to couple certain main windings 210 to certain auxiliary windings 220. The coupling of main windings to auxiliary windings affects a vectorial summation of the phases of each winding, resulting in three common phases. Three-phase power is applied to these common phases through terminals X1, Y1, and Z1.

The phases and amplitudes, i.e., voltages, of auxiliary windings 220 are a function of a number of turns in the coils, a slot shift, a coil length, and a coil span, or pitch. Each of auxiliary windings 220 is designed to be summed with one of main windings 210 such that the resulting phase and amplitude is common with one or more other of main windings 210. Electrical machine 200 includes six main windings 210, which are grouped in groups: A1 and A2, B1 and B2, and C1 and C2. When auxiliary winding Y1 is summed with main winding A1, the resulting phase and amplitude is common with that of main winding A2 summed with Y2, allowing those terminals to be coupled. Similarly, auxiliary winding X1 is summed with main winding B1, and auxiliary winding Z1 is summed with main winding C1. With switches 260 closed, electrical machine 200 is operable as a three-phase motor.

In an alternative embodiment, switches 260 are configured such that electrical machine 200 is operable as a three-phase motor when switches 260 are open, and electrical machine 200 is further operable as a generator when switches 260 are closed.

Figure 3:
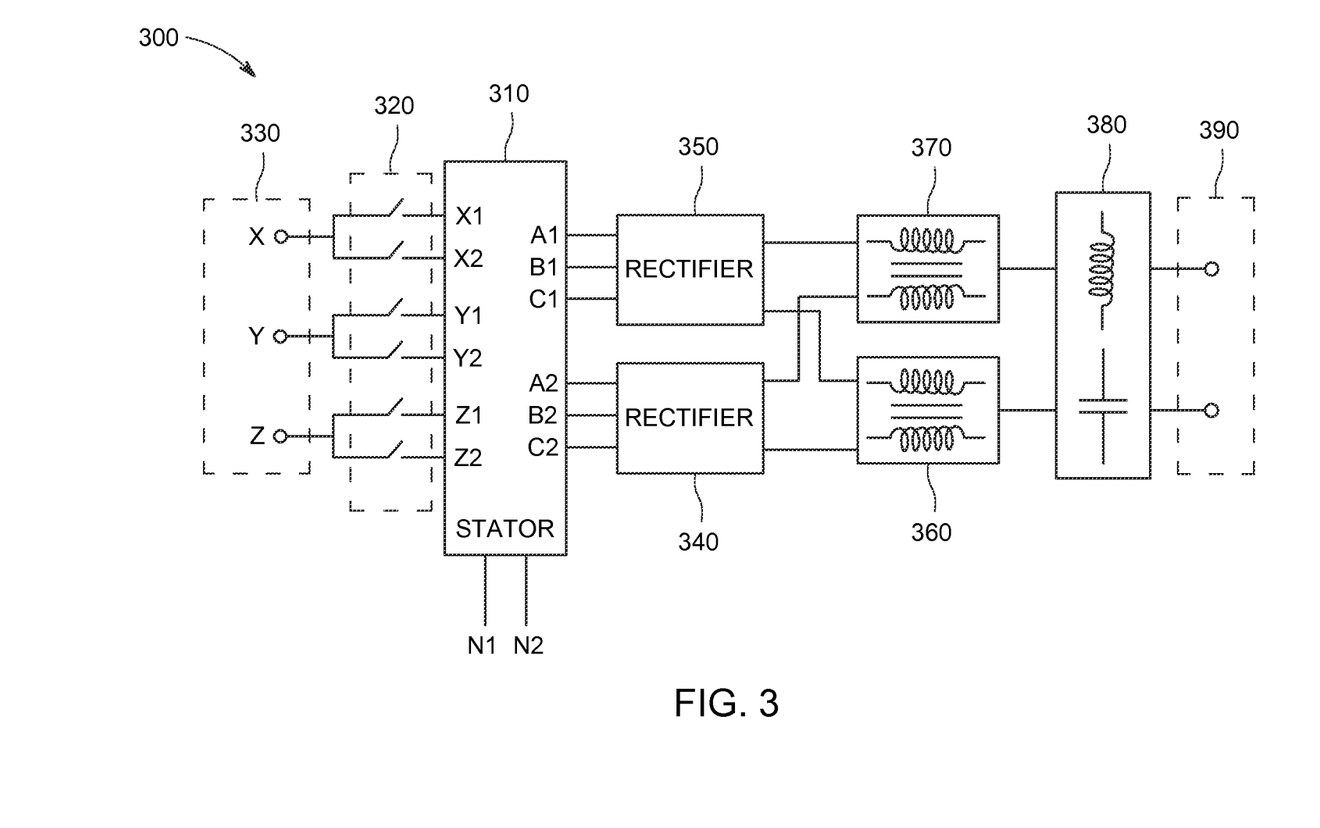
FIG. 3 is a schematic diagram of an exemplary electrical machine for use in the electrical system shown in FIG. 1.

FIG. 3 is a schematic diagram of an exemplary electrical machine 300 for use in electrical system 100 (shown in FIG. 1). Electrical machine 300 is a six-phase machine that includes a stator 310 having main windings A1, B1, C1, A2, B2, and C2, and auxiliary windings X1, Y1, Z1, X2, Y2, and Z2. Stator 310 further includes neutral lines N1 and N2. Auxiliary windings X1, Y1, Z1, X2, Y2, and Z2 are enabled by closing switches 320, converting electrical machine 300 to a three-phase motor power at motoring terminals 330. Switches 320 couple the auxiliary windings to the main windings such that each of the auxiliary windings vectorially sums with a main winding to form a three-phase machine.

During generation, multiphase AC power is generated on main windings A1, B1, C1, A2, B2, and C2. The multiphase AC power is passed through rectifiers 340 and 350 to produce a DC power. The DC power is then passed through transformers 360 and 370, and then filter 380 to produce an output DC power on generator terminals 390.

Figure 4:
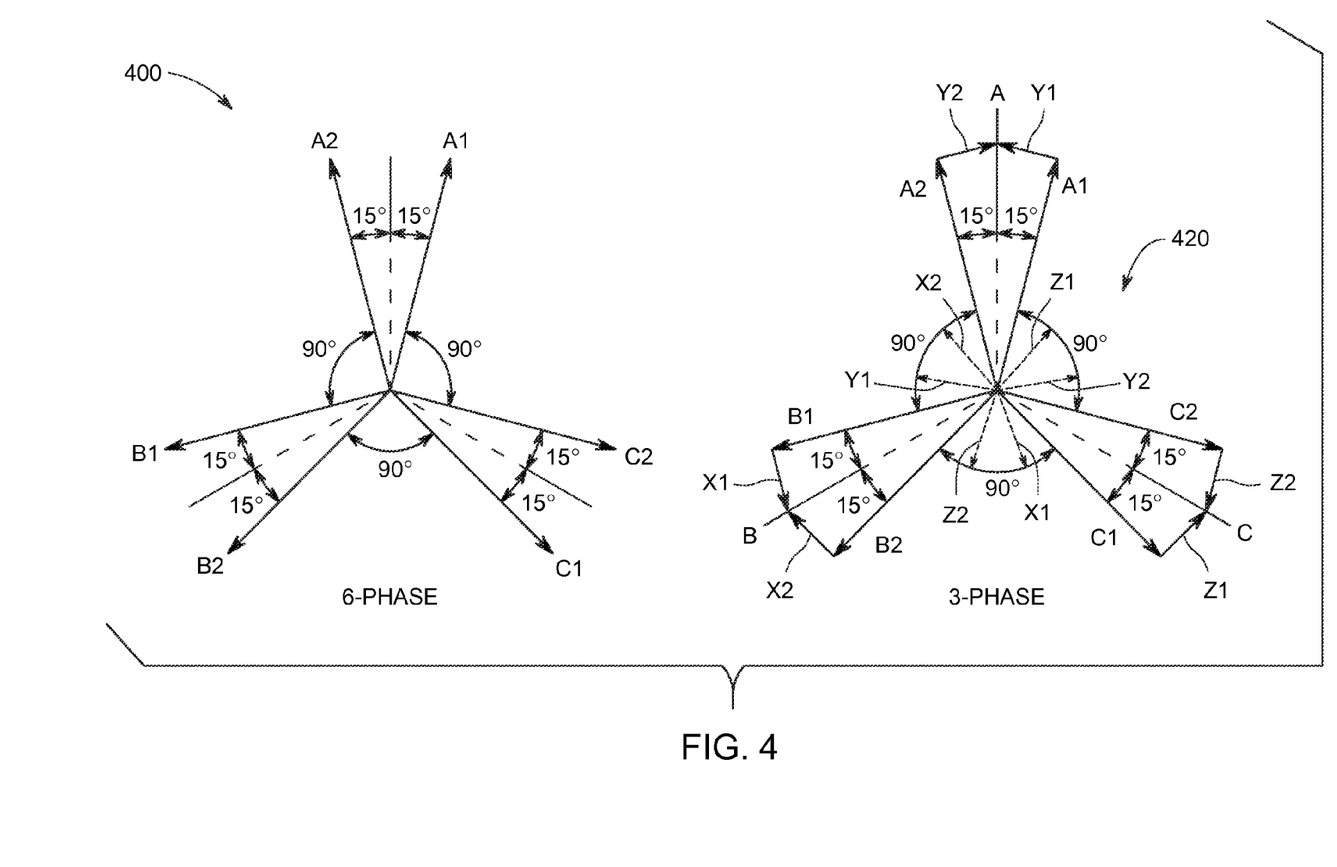
FIG. 4 is a phase diagram for the electrical machines shown in FIGS. 2 and 3.

FIG. 4 is a phase diagram 400 for electrical machines 200 and 300 (shown in FIGS. 2 and 3, respectively). Phase diagram 400 includes a generating phase plot 410 and a motoring phase plot 420 for a six-phase machine.

In generating phase plot 410, six phases corresponding to six main windings are illustrated: A1, B1, C1, A2, B2, and C2. The six phases are arranged in two three-phase sets, where each of the three phases is shifted by 120 degrees from the others. Further, the three-phase sets are phase shifted from each other by 30 degrees. During generation, AC voltages are generated at each of the six phases, each phase shifted from each other.

In motoring phase plot 420, main phases A1, B1 C1, A2, B2, and C2 are shown. Motoring phase plot 420 further illustrates auxiliary windings X1, X2, Y1, Y2, Z1, and Z2. Motoring phase plot 420 further illustrates that when the auxiliary windings are coupled to the main windings, the six-phase machine is transformed into a three-phase machine having phases A, B, and C. Phase A is a combination of main phases A1 and A2 and auxiliary phases Y1 and Y2. When main winding A1 is coupled to auxiliary winding Y1, the summation of the respective phases and amplitudes is the phase and amplitude of phase A. Likewise, when main winding A2 is coupled to auxiliary winding Y2, the summation of the respective phases and amplitudes is the phase and amplitude of phase A. Similarly, phase B is a combination of main phases B1 and B2 and auxiliary phases X1 and X2, and phase C is a combination of main phases C1 and C2 and auxiliary phases Z1 and Z2.

Each of auxiliary windings X1, X2, Y1, Y2, Z1, and Z2 is designed such that the vector sum of their phase and amplitude with one of main windings A1, B1, C1, A2, B2, and C2 will produce a common phase and amplitude with another of the main windings. For example, as is shown in motoring phase plot 420, auxiliary winding Y1 has a coil length, number of turns, coil pitch, and slot position such that it produces a phase and amplitude that, when coupled with main winding A1, produces the phase and amplitude of phase A, which is a common phase and amplitude with the summation of main winding A2 and auxiliary winding Y2.

In an alternative embodiment, auxiliary windings X1, X2, Y1, Y2, Z1, and Z2 are coupled to one three-phase set of main windings A1, B1 C1, A2, B2, and C2. For example, an auxiliary winding Y is coupled to main winding A2, where the vector summation of phase Y and A2 is A1. Rather than resulting in an intermediate phase A, as is shown in motoring phase plot 420, the common phase and amplitude is simply phase A1.

Figure 5:
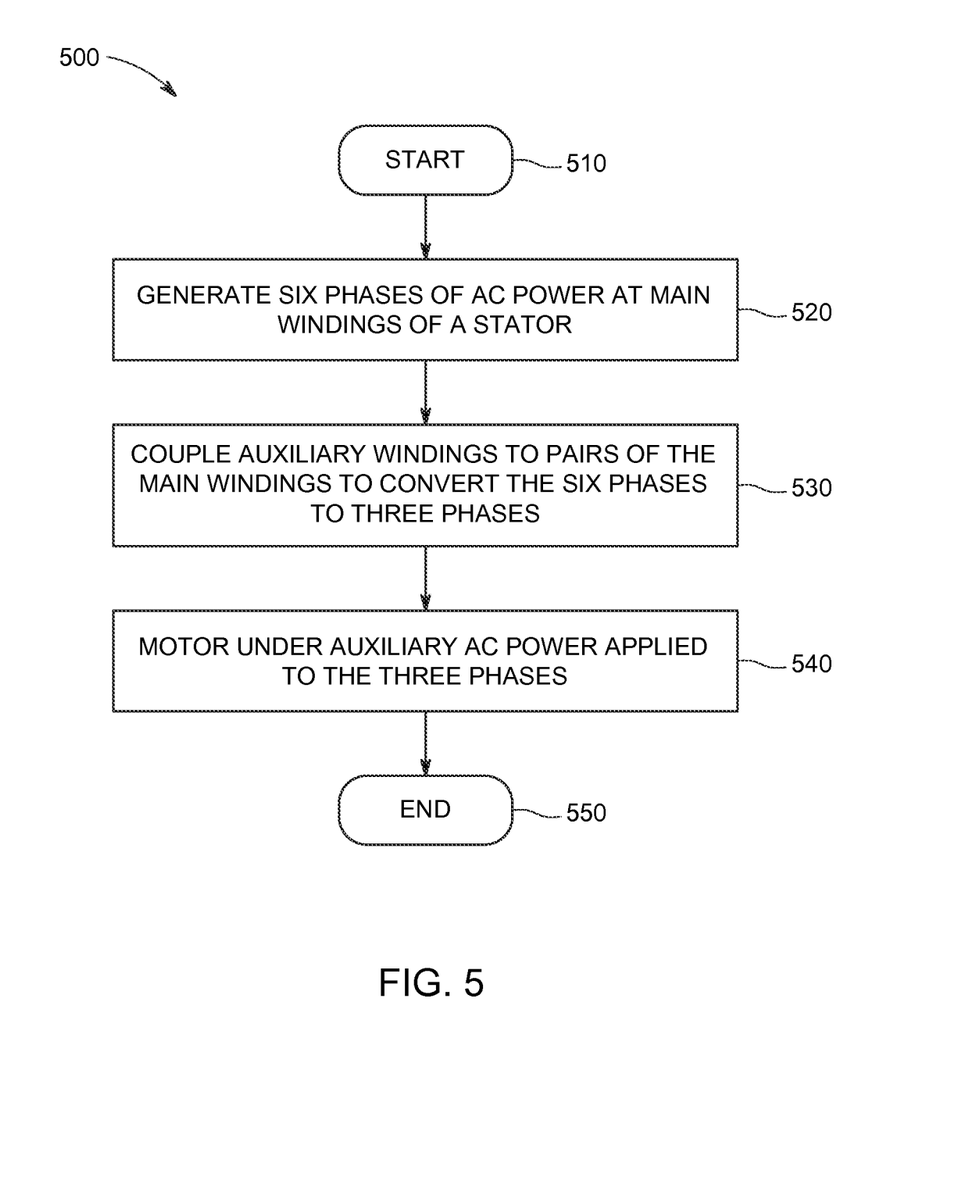
FIG. 5 is a flow diagram of an exemplary method of using an electrical machine, such as the electrical machines shown in FIGS. 1, 2, and 3.

FIG. 5 is a flow diagram of an exemplary method 500 of using an electrical machine, such as electrical machines 102, 200, and 300 (shown in FIGS. 1, 2, and 3, respectively). Referring now to FIGS. 1, 2, and 5, method 500 begins at a start step 510. At a generation step 520, six phases of AC power are generated at main windings 210 of stator 104. In certain embodiments, the six phases of AC power are passed through rectifiers, transformers, and filters to produce a DC output voltage.

At a coupling step 530, auxiliary windings 220 are coupled to main windings 210 by switches 260. The coupling of auxiliary windings 220 and main windings 210 result in a conversion of the six phases to three phases, which facilitates applying an auxiliary three-phase power to main windings 210 and auxiliary windings 220 for motoring. At a motoring step 540, electrical machine 102 motors under the auxiliary three-phase power using the three phases. Method 500 ends at an end step 550.

The above described multiphase electrical machines provide multiphase power generation and three-phase motoring capability. The electrical machines described herein utilize a set of auxiliary windings while motoring. The auxiliary windings are designed to have a particular phase and amplitude such that they each combine with a corresponding main winding to convert the multiphase electrical machine to a three-phase electrical machine, thereby facilitating motoring under an auxiliary three-phase input power. The auxiliary windings are de-energized while generating power. The electrical machines described herein further include power electronics, such as, for example, and without limitation, rectifiers, filters, and transformers to convert generated multiphase AC power to a DC output voltage.

An exemplary technical effect of the methods, systems, and apparatus described herein includes at least one of: (a) three-phase motoring and multiphase power generation in a single electrical machine package; (b) reducing necessary power electronics for power conditioning and phase shifting;

(c) reducing weight of the electrical system by elimination of power electronics; (d) incorporating rectifiers, transformers, and filters into the electrical machine package; (e) improving efficiency of electrical system through elimination of lossy power electronics; and (f) improving efficiency of overall system through weight reduction.

Exemplary embodiments of methods, systems, and apparatus for multiphase electrical machines are not limited to the specific embodiments described herein, but rather, components of systems and/or steps of the methods may be utilized independently and separately from other components and/or steps described herein. For example, the methods may also be used in combination with other non-conventional multiphase electrical machines, and are not limited to practice with only the systems and methods as described herein. Rather, the exemplary embodiment can be implemented and utilized in connection with many other applications, equipment, and systems that may benefit from reduced cost, reduced complexity, commercial availability, improved reliability at high temperatures, and increased memory capacity.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical machine, comprising:
    a stator comprising auxiliary windings and main windings, said main windings grouped into groups of said main windings;
    a rotor couplable to a prime mover configured to turn said rotor relative to said stator to generate at least six phases of alternating current (AC) power at said main windings; and
    a plurality of switches respectively coupled between said auxiliary windings and the groups of said main windings, said plurality of switches configured to convert the at least six phases to three phases when said plurality of switches is closed.

2. The electrical machine in accordance with claim 1, wherein said plurality of switches is open when the prime mover turns said rotor to generate the at least six phases of AC power, and wherein said plurality of switches is closed when three-phase AC power is applied to said stator to turn said rotor for motoring.

3. The electrical machine in accordance with claim 2, wherein said auxiliary windings are de-energized when said plurality of switches is open.

4. The electrical machine in accordance with claim 1, wherein said main windings comprise a plurality of sets of three-phase windings, each phase having a phase shift from another.

5. The electrical machine in accordance with claim 4, wherein said auxiliary windings have respective phases and amplitudes such that the groups of said main windings, when respectively summed with said auxiliary windings, sum to the three phases and corresponding common voltages.

6. The electrical machine in accordance with claim 5, wherein the respective phases and amplitudes of said auxiliary windings are functions of respective coil lengths, coil turns, and coil pitches of said auxiliary windings.

7. The electrical machine in accordance with claim 1 further comprising:
    a plurality of additional windings on said stator, said plurality of additional windings, in combination with said main windings, configured to generate nine phases of AC power when the prime mover turns said rotor; and
    wherein said plurality of switches is further respectively coupled between said plurality of additional windings and the groups of said main windings, said plurality of switches further configured convert the nine phases to the three phases.

8. The electrical machine in accordance with claim 1, wherein said rotor, when turned, is configured to generate nine total phases of AC power at said main windings.

9. A method of using an electrical machine, said method comprising:
    generating at least six phases of alternating current (AC) power at main windings of a stator of the electrical machine;
    coupling auxiliary windings of the stator to groups of the main windings to convert the at least six phases to three phases; and
    motoring under auxiliary AC power applied to the three phases of the electrical machine.

10. The method in accordance with claim 9 further comprising:
    rectifying the six phase AC power generated at the main windings of the stator; and
    filtering rectified power signals to produce a direct current (DC) power output.

11. The method in accordance with claim 9, wherein generating the at least six phases of AC power comprises:
    turning a rotor relative to the stator; and
    producing phase shifted AC voltages at output terminals for the main windings.

12. The method in accordance with claim 9, wherein coupling auxiliary windings to groups of the main windings comprises closing respective switches coupled between each of the main windings and a corresponding auxiliary winding.

13. The method in accordance with claim 9 further comprising de-energizing the auxiliary windings while generating the at least six phases of AC power.

14. The method in accordance with claim 9, wherein each of the auxiliary windings has a phase and amplitude such that, when summed with a corresponding phase and amplitude of a corresponding main winding, sums to a voltage and phase for one of the three phases.

15. An electrical system, comprising:
    an electrical machine comprising main windings and auxiliary windings, said electrical machine operable to generate a multiphase alternating current (AC) power, and motor under three-phase AC power;
    a controller configured to couple said auxiliary windings to said main windings when motoring under the three-phase AC power, and decouple said auxiliary windings when generating the multiphase AC power;

a plurality of switches controllable by said controller and respectively coupled between said auxiliary windings and groups of said main windings, said plurality of switches configured to convert the multiphase AC power to three phases when said plurality of switches is closed;

a rectifier configured to rectify the multiphase AC power to a direct current (DC) power; and an interphase transformer configured to combine outputs of the rectifier to convert the DC power to a DC output voltage.

16. The electrical system in accordance with claim 15, wherein said electrical machine further comprises:
a stator comprising said main windings and said auxiliary windings; and
a rotor couplable to a prime mover configured to turn said rotor relative to said stator to generate the multiphase AC power at said main windings.

17. The electrical system in accordance with claim 15, wherein said rectifier comprises a plurality of multi-pulse rectifiers coupled to respective output terminals for said main windings.

18. The electrical system in accordance with claim 15 further comprising a filter configured to combine DC outputs of the rectifier to generate the DC output voltage.

19. The electrical system in accordance with claim 15, wherein said main windings comprise two sets of three-phase windings, said main windings configured to generate six-phase AC power.

20. The electrical system in accordance with claim 19, wherein said auxiliary windings comprise six auxiliary windings couplable to said two sets of three-phase windings.

21. The electrical system in accordance with claim 15 further comprising:
an auxiliary power source configured to provide auxiliary DC power; and
a DC bus coupled to said controller and further couplable to said electrical machine and said auxiliary power source through respective switches, said DC bus configured to provide power to said electrical machine from said auxiliary power source when motoring;
wherein said controller is further couplable to an AC load through a switch, said controller further configured to provide AC power to said AC load from said DC bus.

* * * * *